(12) United States Patent
Tanaka

(10) Patent No.: US 8,514,417 B2
(45) Date of Patent: Aug. 20, 2013

(54) ACCESSING FUNCTIONS OF A MULTI-FUNCTION DEVICE

(75) Inventor: Shun Tanaka, West New York, NJ (US)

(73) Assignee: Ricoh Company, Ltd., Tokyo (JP)

( * ) Notice: Subject to any disclaimer, the term of this patent is extended or adjusted under 35 U.S.C. 154(b) by 382 days.

(21) Appl. No.: 13/014,384

(22) Filed: Jan. 26, 2011

(65) Prior Publication Data

US 2012/0191806 A1  Jul. 26, 2012

(51) Int. Cl.
*G06F 3/12* (2006.01)
*H04N 1/60* (2006.01)

(52) U.S. Cl.
USPC ........................................ 358/1.13; 358/1.15

(58) Field of Classification Search
USPC ............. 358/1.1, 1.9, 1.12, 1.13, 1.14, 1.15; 715/704, 736, 741, 744, 769; 709/203
See application file for complete search history.

(56) References Cited

U.S. PATENT DOCUMENTS

| | | | | |
|---|---|---|---|---|
| 6,686,838 B1 * | 2/2004 | Rezvani et al. | | 340/506 |
| 7,289,994 B2 * | 10/2007 | Nixon et al. | | 1/1 |
| 7,633,644 B2 * | 12/2009 | Lum et al. | | 358/1.16 |
| 8,352,477 B2 * | 1/2013 | Uchida et al. | | 707/754 |
| 8,364,802 B1 * | 1/2013 | Keagy et al. | | 709/223 |
| 2009/0070415 A1 * | 3/2009 | Kishi et al. | | 709/203 |
| 2009/0268229 A1 * | 10/2009 | Richardson et al. | | 358/1.15 |
| 2011/0173270 A1 | 7/2011 | Uchida et al. | | |

OTHER PUBLICATIONS

U.S. Appl. No. 12/722,367, filed Mar. 11, 2010 of Yuki Uchida et al.
U.S. Appl. No. 12/722,370, filed Mar. 11, 2010 of Yuki Uchida et al.
U.S. Appl. No. 12/722,374, filed Mar. 11, 2010 of Yuki Uchida et al.
U.S. Appl. No. 12/722,376, filed Mar. 11, 2010 of Yuki Uchida et al.
U.S. Appl. No. 12/722,381, filed Mar. 11, 2010 of Yuki Uchida et al.
U.S. Appl. No. 12/958,686, filed Dec. 2, 2010 of Shun Tanaka.
U.S. Appl. No. 13/036,455, filed Feb. 28, 2011 of Shun Tanaka.
U.S. Appl. No. 13/036,558, filed Feb. 28, 2011 of Shun Tanaka.
U.S. Appl. No. 13/036,644, filed Feb. 28, 2011 of Shun Tanaka.
U.S. Appl. No. 13/036,745, filed Feb. 28, 2011 of Shun Tanaka et al.
U.S. Appl. No. 13/086,608, filed Apr. 14, 2011 of Shun Tanaka et al.
U.S. Appl. No. 13/086,779, filed Apr. 14, 2011 of Shun Tanaka et al.

* cited by examiner

*Primary Examiner* — Gabriel Garcia
(74) *Attorney, Agent, or Firm* — Cooper & Dunham, LLP

(57) ABSTRACT

Apparatuses, systems and methods are provided for accessing functions of a multi-function device.

17 Claims, 25 Drawing Sheets

Fig. 3

| MODULE INFORMATION | |
|---|---|
| Functionality | Module |
| Scanning | System Control<br>Scanner User Interface<br>Scanner Image Processing<br>Scanner Data Communication |
| Printing | System Control<br>Printer User Interface<br>Printer Image Processing<br>Printer Data Communication |
| Copying | System Control<br>User Interface<br>Scanner Image Processing<br>Scanner Data Communication<br>Printer Image Processing<br>Printer Data Communication |
| Phone/Voice | System Control<br>Speaker<br>Microphone<br>Voice Data convertor |
| System Control | Scanner Settings<br>Printer Settings<br>Microphone Settings |

Fig. 7

| DEVICE INFORMATION | | | |
|---|---|---|---|
| Device Name | Installed Module(s) | Device Location | Network Address |
| Client Terminal 65 | System Control<br>Printer User Interface<br>Printer Data Communication<br>Speaker Control<br>Microphone | X1, Y1 | 123.99.000.1 |
| Multi-Function Apparatus 67 | System Control<br>Printer User Interface<br>Printer Data Communication | X2, Y2 | 123.99.000.2 |
| MFD 62 | Communication<br>Voice Data Converter | X3, Y3 | 123.99.000.3 |
| Printer 63 | Printer Image Processor<br>Printer Data Communication<br>Plotter | X4, Y4 | 123.99.000.4 |
| Scanner 64 | Scanner Image Processor<br>Scanner Data Communication | X5, Y5 | 123.99.000.5 |
| Copier 66 | Scanner Image Processor<br>Scanner Data Communication<br>Printer Image Processor<br>Printer Data Communication<br>Plotter | X6, Y6 | 123.99.000.6 |

Fig. 13

| JOB LIST |
|---|
| Job 01 |
| Job 02 |
| Job 03 |
| Job 04 |

Fig. 14

Please select a job:

| |
|---|
| Job 01 |
| Job 02 |
| Job 03 |
| Job 04 |
| Job 05 |

[Submit]

Fig. 16

| JOB LIST | |
|---|---|
| Job ID | User Information |
| PrintJob 71 | John Smith |
| PrintJob 72 | John Smith |
| PrintJob 73 | Jane Doe |
| PrintJob 74 | John Smith |
| PrintJob 75 | Jane Doe |

ACCESSING FUNCTIONS OF A MULTI-FUNCTION DEVICE

TECHNICAL FIELD

This disclosure relates to tools (systems, apparatuses, methodologies, computer program products, etc.) for accessing functions of a multi-function device.

BACKGROUND

In the current information age, information technology (IT) tools are extensively used in enterprises and other organizations in order to process documents and data.

For example, multi-function devices (MFDs) are virtually a staple in the typical IT toolkit of an organization, and the number of functionalities (such as scanning, printing, copying, email, and web and/or file browsing, and so forth) that may be performed by a MFD is typically large and is increasing.

However, a user desiring to use the functionalities of a MFD is often forced to be physically present at the MFD to operate the MFD, in order to utilize the functionalities of the MFD.

On the other hand, in order to provide each of the functionalities that users that wish to obtain, the conventional MFD must be configured to include the full complement of hardware and software components natively. Such approach requires the MFD to have large storage capacity, processing power and other system and/or network resources.

There exists a need for an improved multi-function apparatus that does not need to maintain all of the resources natively for providing the functionalities that users wish to obtain.

SUMMARY

In an aspect of this disclosure, module information maintained by a maintenance part of a multi-function apparatus indicates, for each functionality provided to a client, one or more modules corresponding to the functionality (and information indicating where the module(s) can be obtained), and a module access part determines, based on the module information, a first module associated with a first functionality, in response to a request, received from a client terminal via a network, for the first functionality, and retrieves the first module, via the network from another device (for example, a multi-function device, or storage or other device), and causes the first module to be executed in response to the request from the client terminal via the network.

In another aspect, the module access part causes the first module, retrieved via the network from another device, to be executed by the multi-function apparatus in order to provide the first functionality.

In another aspect, results from execution of the first module by the multi-function apparatus are provided to the client terminal via the network, in response to a request from the client terminal.

In another aspect, the module access part determines the first module associated with the first functionality by (i) analyzing module information to determine a plurality of modules corresponding to the first functionality, and (ii) determining which of the plurality of modules corresponding to the first functionality is not installed on the multi-function apparatus.

In another aspect, the module access part determines the first module associated with the first functionality by (i) analyzing module information to determine a plurality of modules corresponding to the first functionality, and (ii) determining which of the plurality of modules corresponding to the first functionality is not installed on the client terminal.

In another aspect, the module access part provides, to the client terminal via the network, access to, and a resource locator of, a retrieved first module, and the client terminal utilizes the resource locator of the first module in order to obtain the first functionality.

In another aspect, the maintenance part maintains device information indicating modules of a plurality of multi-function devices connected to the network, and the module access part determines, based on the device information maintained by the maintenance part, which one of the plurality of multi-function devices includes the first module associated with the first functionality.

In another aspect of this disclosure, the module access part (a) determines, based on the module information maintained by the maintenance part, the first module associated with the first functionality, in response to a request, received from the client terminal via the network, for the first functionality, and (b) instructs a network-connected device having the first module to remotely execute the first module, in order to provide the first functionality.

In another aspect, an execution result of the first module at the network-connected device is provided, via the network, to any one of a client terminal, the multi-function apparatus, a storage server, etc., connected to the network.

In another aspect, the module access part interfaces the client terminal and the network-connected device, such that the client terminal remotely accesses the first module at the network-connected device via the network, to obtain the first functionality.

In another aspect, the module access part determines which one of a plurality of multi-function devices connected to the network includes the first module, and the module access part instructs said one of the plurality of multi-function devices to remotely execute the first module, in order to provide the first functionality.

BRIEF DESCRIPTION OF THE DRAWINGS

The aforementioned and other aspects, features and advantages can be more readily understood from the following detailed description with reference to the accompanying drawings wherein:

FIG. 3 shows an example of module information;

FIG. 7 shows an example of device information;

FIG. 13 shows an example of a job list;

FIG. 14 shows an example of a user interface of a multi-function apparatus;

FIG. 16 shows another example of a job list;

DETAILED DESCRIPTION

Figure 1:
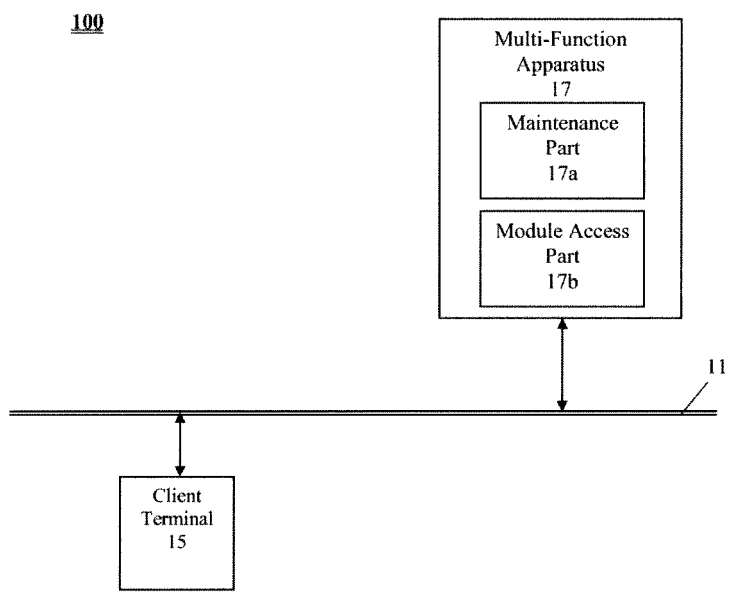
FIG. 1 shows a block diagram of a system, according to an exemplary embodiment of this disclosure.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, FIG. 1A shows schematically a system 100 for remotely accessing the functions of a multi-function device according to an exemplary embodiment of this disclosure, where the system 100 is an active system.

System 100 includes a client terminal 15 and a multi-function apparatus 17, all of which are interconnected by a network 11.

The multi-function apparatus 17 is configured to provide functionalities to clients, such as client terminal 15. The multi-function apparatus 17 stores and/or includes a plurality of modules and/or can perform one or more functionalities, as described hereinafter. The multi-function apparatus may be any apparatus (including a microprocessor chip or a collection of devices having varying degrees of integration) that has the ability to perform one or more functionalities. The multi-function apparatus 17 (and/or client terminal 15) may be a terminal or any computing device including but not limited to a personal, notebook or workstation computer, a kiosk, a PDA (personal digital assistant), a tablet computing device, a smartphone, a scanner, a printer, a facsimile machine, a server, a mobile phone or handset, another information terminal, etc. The client terminal 15 can be configured, such as by software, to communicate through the network 11 with the multi-function apparatus 17.

The multi-function apparatus 17 of FIG. 1A includes a maintenance part 17a and module access part 17b.

In a typical operation flow, the multi-function apparatus 17 receives a request for a functionality (hereinafter the "first functionality"), such as from the client terminal 15 via the network 11, or through a user interface of the multi-function apparatus. The request may be transmitted from the client terminal 15 as a result of a user of the client terminal issuing a request for the performance/execution of the first functionality. The first functionality may be, for example, a scanning functionality, a printing functionality, a copying functionality, a phone/voice functionality, or another functionality.

The maintenance part 17a of the multi-function device 17 maintains module information indicating, for each one of a plurality of functionalities, one or more modules corresponding to the functionality. FIG. 3 depicts an example of module information maintained by the multi-function device 17.

As seen in FIG. 3, the module information can include a list of functionalities (such as scanning functionality, printing functionality, copying functionality, phone/voice functionality, and so forth). The module information also lists, in association with each specific one of the listed functionalities, one or more modules corresponding to that specific functionality. For example, as illustrated in FIG. 3, the scanning functionality is stored in association with the list of modules identifying a system control module, a scanner user interface module, a scanner image processor module, and a scanner data communication module. The listed modules associated with each functionality indicate the modules required for performing that functionality. That is, in the example of FIG. 3, a system control module, a scanner user interface module, a scanner image processor module, and a scanner data communication module are required in order to perform the scanning functionality.

The module access part 17b of the multi-function apparatus 17 determines, based on the module information maintained by the maintenance part 17a, at least one module (hereinafter the "first module") associated with the first functionality. For example, the first module may be one that is required for performing/executing (by the client terminal 15, multi-function device 17, or another device) the first functionality, in response to the request for the first functionality, received at the input part 17a from the client terminal 15, as described above.

Using the example of FIG. 3, if the first functionality in the execution request is a printing functionality, then the module access part 17b may access the module information to ascertain that the printing functionality in general requires the system control module, printer user interface module, printer image processor module, and printer data communication module.

As described in this disclosure, a module refers to a unit or element required to perform a part of whole of a function. The module may be embodied as a hardware component, software component and/or code module installable on a multi-function device or apparatus. For example, a user interface module may refer to a keyboard, keypad, mouse, or touch screen device. A controller module may refer to a software program, a microprocessor or Central Processing Unit (CPU). A communication module may refer to a network card, network adapter or Network Interface Card (NIC), for example. A scanner module may refer to a scanner device that optically scans hardcopy images or object and generates a digital image. A printer module may refer to peripheral device that forms graphics on a physical print media. A printer image processor may refer to software application such as a printer driver for processing data to create printer-dependent data in a format ready for printing, for example.

In order to perform an operation or functionality, a single module may be required, or more than one module may be required. For example, in order to perform a scanning operation, a scanner module may alone be required, or instead a scanner image processor module in combination with a system control module, scanner user interface module, scanner data communications module, etc. may be required, depending on how the functions and modules are defined. Many alternatives, modifications, permutations and variations will become apparent to those skilled in the art.

The module access part 17b may thus determine one or more modules associated with the first functionality for performing the first functionality. Moreover, the module access part 17b may limit its determination (of modules required by for performing the first functionality) to modules not already installed at the client terminal 15 and/or the multi-function apparatus 17. For example, the module access part 17b may store information regarding modules already stored at the client terminal 15 and/or multi-function device 17, or may communicate with devices via the network 11 in order to obtain such information.

The module access part 17b is also configured to retrieve the first module via the network 11, from another device (not shown) connected to the network 11. For example, if the first module is stored at another network-connected device (not shown), the multi-function apparatus 17 may communicate with that network-connected device via the network 11 in order to obtain the first module. The retrieved first module may be stored at the storage part (not shown) of the multi-function apparatus 17. Moreover, the module access part 17b is configured to cause the first module to be executed, in response to the request (received from the client terminal) for the first functionality. That is, the module access part 17b causes the first module to be executed at the multi-function device 17, in order to provide the first functionality.

Referring back to the example based on the module information of FIG. 3, if the first functionality in the execution request is a printing functionality, and the module access part 17b determines that a first module associated with the first functionality (e.g. required to perform the printing functionality, not already installed at the client terminal 15 and/or multi-function apparatus 17) is, for instance, the printer image processor module, then the module access part 17b retrieves the printer image processor module, via the network 11 from another device (not shown) connected to the network 11. Further, the module access part 17b causes the retrieved printer image processor module to be executed (e.g. an operation of the printer image processor module is performed/executed, or the module is otherwise utilized) in order to perform/provide the printing functionality, in response to the request received from client terminal 15.

The result of the execution of the first module at the multi-function apparatus 17 may be provided to the client terminal 15 via the network, in response to the request from the client terminal 15 for the first functionality. For example, a retrieved printer image processor module may be executed by the multi-function apparatus 17, in order to process a print job and perform a printing functionality, wherein the multi-function apparatus 17 transmits the result (processed print job) to the client terminal 15 via the network 11. Alternatively, the multi-function apparatus 17 may indicate to the client terminal 15 how to retrieve/access the result of the execution of the first module.

Thus, according to this exemplary embodiment of this disclosure, there is provided the tools for accessing the functions distributed across a network. According to the aforementioned aspects, a client terminal and/or multi-function apparatus is not required to install hardware and/or software components for all possible functionalities. Instead, when a user of a client terminal wishes to perform a particular functionality, the client terminal transmits an execution request for the particular functionality to a multi-function apparatus. In response, the multi-function apparatus determines one or more modules associated with performing the particular functionality, retrieves these modules via a network from other network-connected devices, and causes these modules to be executed in order to provide the particular functionality to the client terminal. Thus, pressure on system resources is reduced at the client terminal and multi-function apparatus, and shared across modules and devices throughout the network.

While the functionalities described so far include a scanning functionality, a printing functionality, a copying functionality, and so forth, it should be understood that aspects of this disclosure can be applied towards the execution of any functionality that may be performed by or with the use of a client terminal and/or a multi-function apparatus. Such functionalities may include a document processing functionality, image processing functionality, data signal processing functionality, video processing functionality, web conference functionality, email functionality, facsimile functionality, web browsing functionality, phone functionality, voice transcription functionality, and so forth. In particular, the aspects of this disclosure may be applied whenever a functionality or feature thereof is executable with the use of one or more function modules. The modules may be installed in flexible combinations on one or more terminals and/or multi-function devices connected via network, as described in this disclosure.

The multi-function apparatus 17 may include a storage part (not shown) configured to store code modules, and a control part configured to execute the first module and one or more of the code modules to obtain the first functionality. The code modules may thus store various functions in order to support the execution of the first function.

Figure 2:
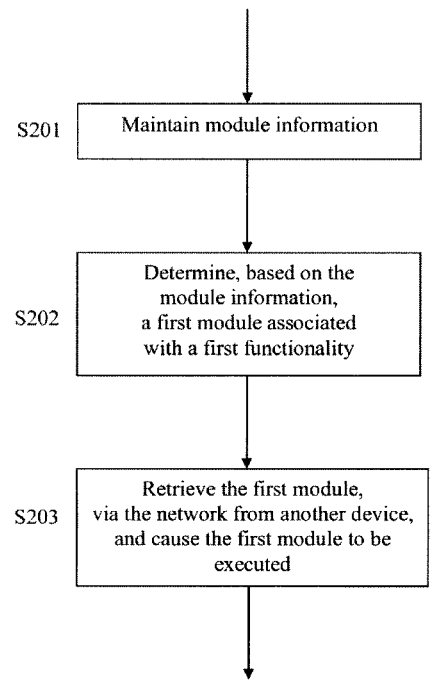
FIG. 2 shows an example of a workflow on a multi-function apparatus side.

Turning now to FIG. 2, there is shown an example of a workflow on a multi-function apparatus side, such as the multi-function apparatus 17 in FIG. 1A.

In S201, the multi-function apparatus maintains module information indicating, for each of a plurality of functionalities, one or more modules corresponding to the functionality. In S202, the multi-function apparatus determines, based on the module information maintained in S201, a first module associated with a first functionality, in response to a request for the first functionality, received from a client terminal via a network.

In S203, the multi-function apparatus retrieves the first module determined in S202, via the network from another device, and causes the retrieved first module to be executed, in response to the request for the first functionality, received from the client terminal via the network.

The multi-function apparatus of this disclosure may be realized by a computer program product including a computer-usable, non-transient medium (such as a disk storage apparatus) having instructions tangibly embodied therein that are executed by a computer. Thus, it should be understood that the multi-function apparatus may be executed on a computer. While the multi-function apparatus is shown as being external to the client terminal, the multi-function apparatus may in fact be executed on a client terminal.

The multi-function apparatus may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

The network 11 can include one or more of a secure intranet or extranet local area network, a wide area network, any type of network that allows secure access, etc., or a combination thereof. Further, other secure communications links (such as a virtual private network, a wireless link, etc.) may be used as well in the network 11. In addition, the network 11 preferably uses TCP/IP (Transmission Control Protocol/Internet Protocol), but other protocols can also be used. How devices can connect to and communicate over the network 11 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 4:
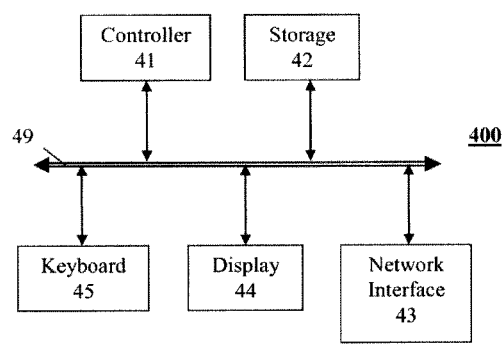
FIG. 4 shows a block diagram of an exemplary configuration of a multi-function apparatus.

FIG. 4 shows an exemplary constitution of a multi-function apparatus 400 as a computer, for example, that can be configured through software to provide the multi-function apparatus 17 of FIG. 1. As shown in FIG. 4, the multi-function apparatus 400 includes a controller (or central processing unit) 41 that communicates with a number of other components, including memory or storage part 42, network interface 43, display 44 and keyboard 45, by way of a system bus 49.

The multi-function apparatus 400 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In multi-function apparatus 400, the controller 41 executes program code instructions that controls device operations. The controller 41, memory/storage 42, network interface 43, display 44 and keyboard 45 are conventional, and therefore in order to avoid occluding the inventive aspects of this disclosure, such conventional aspects will not be discussed in detail herein.

The multi-function apparatus 400 includes the network interface 43 for communications through a network, such as communications through the network 41 with the client terminal 15 in FIG. 1. However, it should be appreciated that the subject matter of this disclosure is not limited to such configuration. For example, the multi-function apparatus 400 may communicate with client terminals through direct connections and/or through a network to which some components are not connected. As another example, the multi-function apparatus 400 need not be provided by a server that services terminals, but rather may communicate with the devices on a peer basis, or in another fashion.

As mentioned above, multi-function apparatus 17 is not limited to a server or computer, but can be manifested in any of various devices that can be configured to communicate over a network and/or the Internet.

Figure 5:
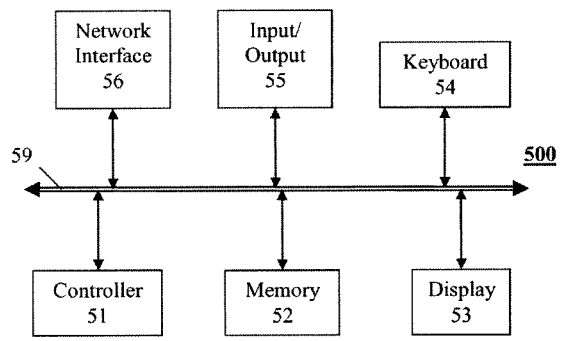
FIG. 5 shows a block diagram of an exemplary configuration of a client terminal.

An example of a configuration of a client terminal 15 is shown schematically in FIG. 5. In FIG. 5, device 500 includes a controller (or central processing unit) 51 that communicates with a number of other components, including memory 52, display 53, keyboard (and/or keypad) 54, other input/output (such as mouse, touchpad, stylus, microphone and/or speaker with voice/speech interface and/or recognition software, etc.) 55, and network interface 56, by way of internal bus 59.

The memory 52 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 56 provides a connection (for example, by way of an Ethernet connection or other network connection which supports any desired network protocol such as, but not limited to TCP/IP, IPX, IPX/SPX, or Net-BEUI) to network 11.

A user interface may be provided and is configured through software natively or received through a network connection, to allow the user to access electronic data or content on the client terminal and/or via the network, interact with network-connected devices and services (such as the multi-function apparatus 17), enjoy other software-driven functionalities, etc. For example, a browser (such as Internet Explorer™, Netscape Navigator™, a proprietary browser, etc.) may be provided on the device so that a user of the device can use browsing operations to communicate with the multi-function apparatus 17, and access other data or content.

Additional aspects or components of the device 500 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

As described above, the module access part 17b causes the first module to be executed at the multi-function apparatus 17 (after the first module is retrieved via the network from the other network-connected device) and the result of the execution of the first module by the multi-function apparatus 17 is provided to the client terminal 15 via the network. However, it is also possible for the module access part 17b to transmit the retrieved first module to the client terminal 15 via the network. In this way, the client terminal 15 may itself execute the first module now present at the client terminal, in order to obtain the first functionality. For example, if the first functionality is the phone/voice functionality (such as converting an audio input into a digital signal), and the first module is a voice data converter module, the multi-function apparatus 17 may retrieve the voice data converter module from another network-connected device, and transmit the voice data converter module to the client terminal 15. The client terminal 15 may then utilize the voice data converter module so that the phone/voice functionality may be obtained.

On the other hand, the module access part 17b may provide, to the client terminal via the network, access to the retrieved first module that is now installed/present at the multi-function apparatus 17. For instance, a controller of the client terminal 15 may communicate with the retrieved first module present at the multi-function apparatus 17 through the network, transmitting commands and input data to the first module via the network, and receiving responses and processed output data from the first module via the network in response to the transmitted commands. Alternatively, the module access part 17b may provide, to the client terminal via the network, access to, and a resource locator (or network address) of, the retrieved first module, and the client terminal utilizes the resource locator to the first module in order to obtain the first functionality. In this way, the client terminal remotely executes the first module, still installed/present at the multi-function device 17, in order to obtain the first functionality. As a demonstrative example, if the first functionality is the phone/voice functionality and the first module is a voice data converter module, the multi-function device 17 may retrieve the voice data converter module from another network-connected device, and allow the client terminal 15 to remotely access the voice data converter module installed at the multi-function device 17. The client terminal 15 may thus utilize the voice data converter module so that the phone/voice functionality may be obtained, even though the voice data converter module is not transmitted to the client terminal 15.

According to another aspect of this disclosure, the maintenance part of the multi-function apparatus maintains device information indicating modules installed on a client terminal, on the multi-function apparatus itself, and/or one or more of a plurality of other network-connected devices.

Figure 6:
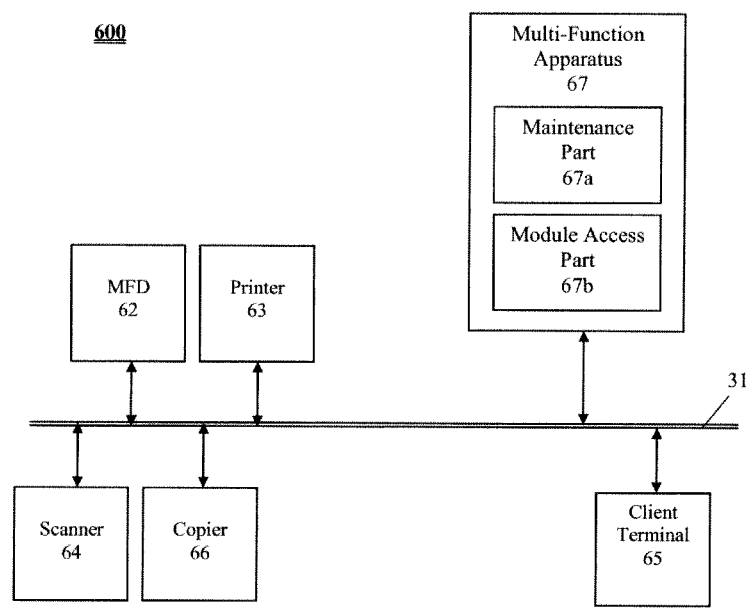
FIG. 6 shows a block diagram of a system, according to an aspect of this disclosure.

FIG. 6, for example, depicts systems 600, which is similar to the system 100 depicted in FIG. 1. In FIG. 6, a multi-function apparatus 67, client terminal 65, and a plurality of network-connected devices 62, 63, 64 and 66 are connected to the network 61. The multi-function apparatus 67 and client terminal 65 may be substantially similar to the multi-function apparatus 17 and client terminal 15 depicted in FIG. 1. According to this aspect, the maintenance part 67*a* of the multi-function apparatus 67 maintains device information indicating modules installed on client terminal 65, the multi-function apparatus 67 and/or the plurality of network-connected device 62, 63, 64 and 66.

An example of device information is depicted in FIG. 7. The device information may list device names corresponding to the devices connected to the network 61, such as client terminal 65, MFD 62, etc. The device information also lists the modules installed or present at each of the devices. For example, it can be seen in the device information of FIG. 7 that the client terminal 65 has the System Control module, Printer User Interface module, Printer Data Communication module, Speaker Control module, and Microphone module.

According another aspect, the module access part 67*b* of the multi-function apparatus 67 is configured to determine the module(s) associated with the first functionality. The module access part analyzes the module information maintained by the maintenance part 67*a*, in order to determine a plurality of modules corresponding to the first functionality, and determines, based on the device information maintained by the maintenance part 67*a*, which, if any, of the modules corresponding to the first functionality is not already installed or natively available on the multi-function apparatus 67.

Using the example of the module information of FIG. 3 and the device information of FIG. 7, suppose the first functionality in the execution request received from client terminal 65 is a printing functionality. According to these aspects, the following occurs: (i) the module access part 67*b* analyzes the module information of FIG. 3 and determines that the four module(s) corresponding to the printing functionality are the system control module, printer user interface module, printer image processor module, and printer data communication module; and (ii) the module access part 67*b* determines, based on the device information of the multi-function apparatus 67 depicted in FIG. 7, that of the aforementioned four modules required for performing the printing functionality, the printer image processor module is not already installed or natively available on the multi-function apparatus 67.

Thus, according to this aspect, the multi-function apparatus determines one or more modules required by a multi-function apparatus (which are not natively available on the multi-function apparatus) for performing the desired functionality. The multi-function apparatus may then retrieve and execute the one or more determined modules via the network.

According to this aspect, it is also possible that the multi-function apparatus may determine which of the modules corresponding to the first functionality are not already installed or natively available on the client terminal 65, based on the device information maintained by the maintenance part 67*a*. Using the example of the module information of FIG. 3 and the device information of FIG. 7, suppose the first functionality in the execution request received from client terminal 65 is a phone/voice functionality. Accordingly, the following occurs: (i) the module access part 67*b* analyzes the module information of FIG. 3 and determines that the four module(s) corresponding to the voice/data functionality are the system control module, speaker module, microphone module, and voice data converter module; and (ii) the module access part 67*b* determines, based on the device information of the client terminal 65 depicted in FIG. 7, that of the aforementioned four modules required for performing the phone/voice functionality, the voice data converter module is not already installed or natively available on the client terminal 65.

According to another aspect of this disclosure, the module access part of the multi-function apparatus determines, based on device information maintained by the maintenance part 67*a*, which one of the plurality of multi-function devices (MFDs) includes the first module associated with the first functionality. In this example, the plurality of "multi-function devices" is considered to be devices 62, 64, 64 and 66.

Using the example of the module information of FIG. 3 and the device information of FIG. 7, suppose the first functionality in the execution request received from the client terminal 65 is a printing functionality, and the module access part 67*b* has determined that the system control module, printer user interface module, printer image processor module and printer data communication module are associated with the printing functionality. (Of these, only the printer image processor module is not already installed at the multi-function apparatus 67).

The module access part 67*b* then determines, by referring to the device information such as that seen in FIG. 3, that printer 63 and copier 66 include a printer image processor module. The module access part 67*b* may then retrieve the determined module(s) via the network 61. For example, the multi-function apparatus 67 may communicate with printer 63 and/or copier 66 via the network 61 in order to obtain the printer image processor module.

Thereafter, the module access part 67*b* may cause the retrieved printer image processor module to be executed in order to provide the first (printing) functionality, as described above. A result of the execution of the retrieved module may be provided to the client terminal 65 via the network 61. (Alternatively, it is possible for the module access part 67*b* to transmit the retrieved first module to the client terminal 65 via the network, so that the client terminal 65 may itself execute the first module now present at the client terminal, in order to obtain the first functionality. On the other hand, the module access part 67*b* may provide, to the client terminal 65 via the network, access to the retrieved first module, so that the client terminal 65 remotely executes the first module, still installed/present at the multi-function apparatus 67, in order to obtain the first functionality.

Figure 8A:
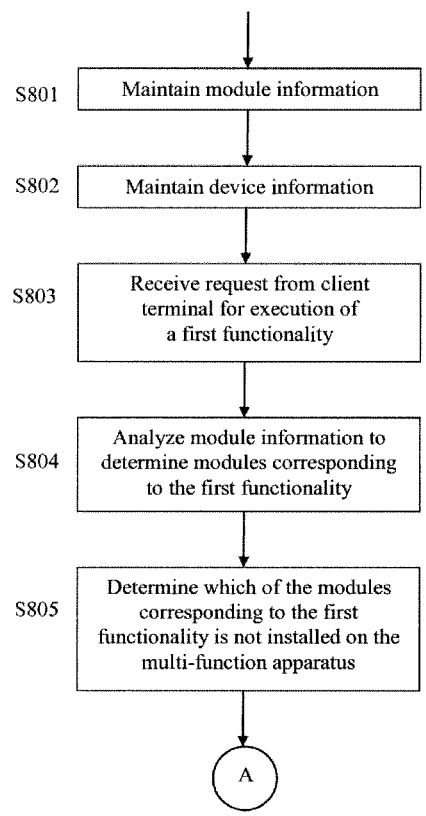
FIGS. 8A and 8B show an example of a more detailed workflow on a multi-function apparatus side.
Figure 8B:
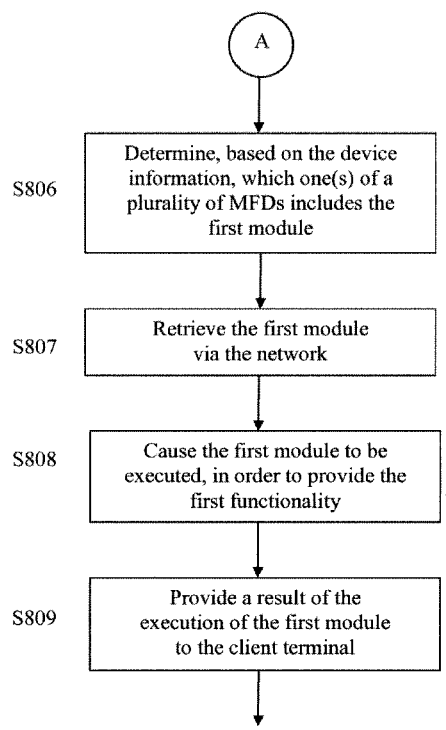

Turning now to FIGS. 8A and 8B, there is shown an example of a workflow on a multi-function apparatus side, such as the multi-function apparatus 67 in FIG. 6, according to certain aforementioned aspects of this disclosure.

In S801, the multi-function apparatus maintains module information indicating, for each of a plurality of functionalities, one or more modules corresponding to the functionality. In S802, the multi-function apparatus maintains device information indicating modules installed at a plurality of network-connected devices, such as a client terminal, the multi-function apparatus and one or more other MFD(s). In S803, the multi-function apparatus receives a request, from the client terminal via a network, for a first functionality. Note that the order of S801 through S803 is not fixed, and may be changed.

In S804, the multi-function apparatus analyzes the module information maintained in S801 to determine a plurality of modules corresponding to the first functionality. Thereafter, in S805 the multi-function apparatus determines, with use of the device information maintained in S802, which of the modules corresponding to the first functionality is not installed at the multi-function apparatus (and/or client terminal). In this way, the multi-function apparatus may determine at least a first module associated with the first functionality for performing the first functionality.

In steps S806, the multi-function apparatus determines which one(s) of a plurality of MFDs connected to a network includes the first module (identified in S805). The multi-function apparatus makes these determinations based on the device information, maintained in S802. In S807, the multi-function apparatus retrieves the first module, via the network from said one of the plurality of MFDs identified in S806.

In S808, the multi-function apparatus causes the first module to be executed in order to provide the first functionality, in response to the request for the first functionality (received from the client terminal in S803). Finally, in S809 the multi-function apparatus provides a result of the execution of the first module to the client terminal.

As an alternative to steps S808 and S809, the multi-function apparatus may transmit the retrieved first module to the client terminal via the network, wherein the client terminal executes the first module in order to obtain the first functionality. As another alternative to steps S808 and S809, the multi-function apparatus may provide, to the client terminal via the network, access to the retrieved first module, wherein the client terminal executes the first module at the multi-function device in order to perform the first functionality.

Figure 9A:
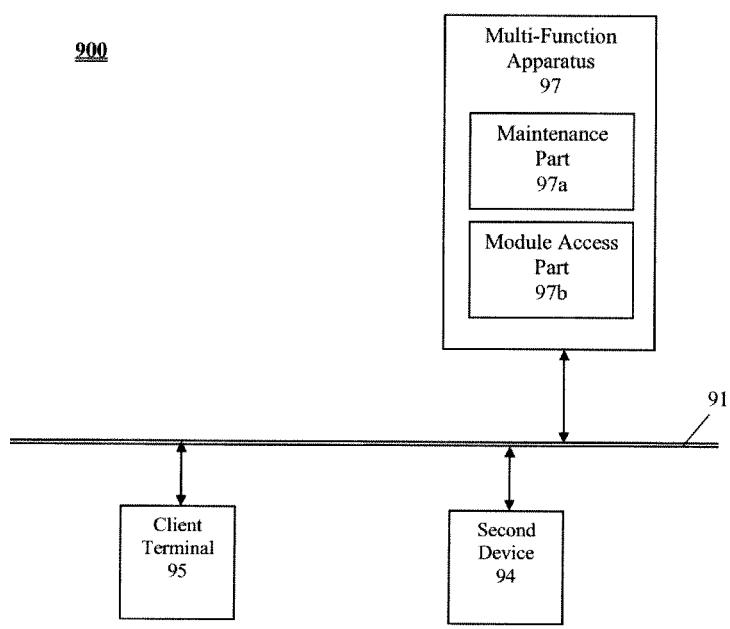
FIGS. 9A and 9B show block diagrams of a system, according to another exemplary embodiment of this disclosure.

Turning now to FIG. 9A, another exemplary embodiment of this disclosure is described.

In the previous embodiment described above, a module access part of a multi-function apparatus retrieves a first module, via a network from another device, and causes the first module to be executed at the multi-function apparatus, in order to provide a first functionality. On the other hand, in the present exemplary embodiment of this disclosure, a module access part of a multi-function apparatus instructs a network-connected device having the first module to remotely execute the first module, in order to provide the first functionality.

System 900 includes a client terminal 95, second device 94, and a multi-function apparatus 97, all of which are interconnected by a network 91. The client terminal 95 may be substantially similar to the client terminal 15 depicted in FIG. 1. The maintenance part 97a of the multi-function apparatus 97 is substantially similar to maintenance part 17a of multi-function apparatus 17 depicted in FIG. 1.

The module access part 97b of the multi-function device 97 may be configured to determine, based on the module information maintained by the maintenance part 97a, a first module associated with a first functionality, as described in the previous embodiment.

The module access part 97b is also configured to instruct a network-connected device having the first module to remotely execute the first module, in order to provide the first functionality. That is, if the first module is stored at second device 94, the multi-function apparatus 97 may communicate with the second device via the network 91 and instruct the second device to remotely execute the first module, in order to provide the first functionality, in response to a request (received from the client terminal 95) for the first functionality.

A result of the execution of the first module at the second device 94 may be provided, via the network, from the second device to the client terminal 95 or the multi-function apparatus 97. Moreover, the result may be transmitted to some other device (not shown) such as a storage server or data repository connected to the network 91.

As a demonstrative example, the user of client terminal 95 may transmit an execution request to the multi-function apparatus 97 for performing a printing functionality with respect to an electronic document. In this case, the first functionality is a printing functionality, and the first module may be a printer image processor module installed at the second device. The multi-function apparatus 97 communicates with client terminal 95 via the network in order to obtain print job information. The multi-function apparatus 97 may transmit the print job information received from the client terminal 95 to the second device 94, and the multi-function apparatus 97 may instruct the second device to execute an operation of the printer image processor module at the second device, based on the associated print job information, in order to perform the printing functionality (i.e. print a print job).

Thus, a desired operation is performed on behalf of a client terminal, even though all the modules required for performing the desired operation are not installed at the client terminal and/or multi-function apparatus. Instead, the multi-function apparatus accesses remotely, via a network, the functionalities of various modules distributed across a network and/or installed at various network-connected devices.

Figure 9B:
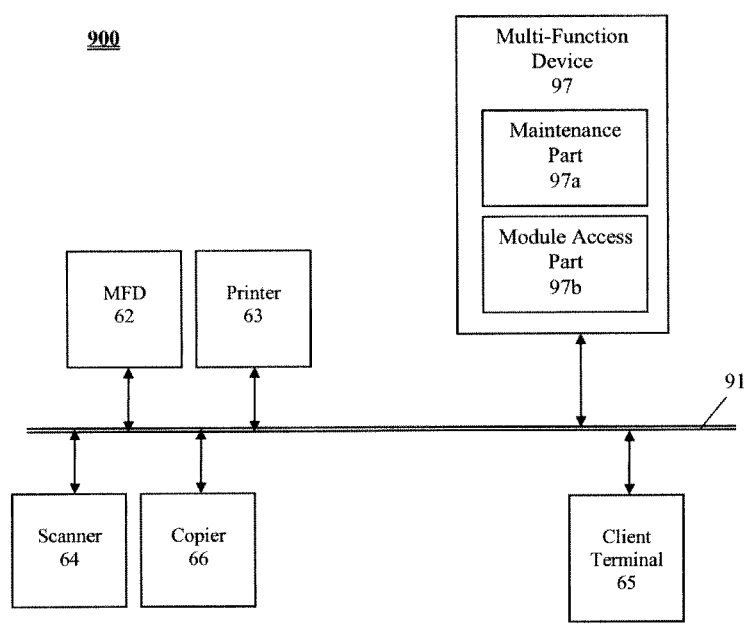
Figure 10:
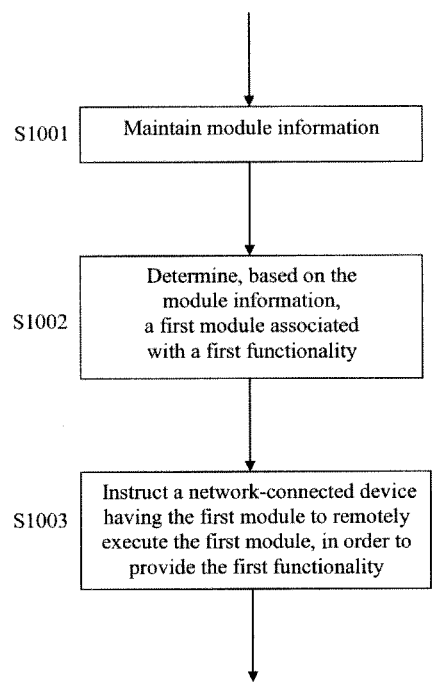
FIG. 10 shows an example of a workflow on a multi-function apparatus side.

Turning now to FIG. 10, there is shown an example of a workflow on a multi-function apparatus side, such as the multi-function apparatus 97 in FIG. 9, according to this exemplary embodiment.

In S1001, the multi-function apparatus maintains module information indicating, for each of a plurality of functionalities, one or more modules corresponding to the functionality.

In S1002, the multi-function apparatus determines, based on the module information maintained in S1001, a first module associated with a first functionality, in response to a request for the first functionality, received from a client terminal via a network.

In S1003, the multi-function apparatus instructs a network-connected device having the first module to remotely execute the first module, in order to provide the first functionality.

It will be understood by those skilled in the art that various aspects of the multi-function apparatus described in the previous embodiment are also applicable to the multi-function apparatus of the present embodiment.

For example, according to an aspect, the maintenance part 97a of the multi-function apparatus 97 maintains device information indicating modules installed on a client terminal, on multi-function apparatus itself, and/or one or more of a plurality of other MFDs connected to a network. An example of device information is depicted in FIG. 7.

According another aspect described above, the module access part 97b of the multi-function apparatus 97 determines the first module associated with the first functionality (required for performing the first functionality), by executing the following: (i) The module access part analyzes the module information maintained by the maintenance part 97a, in order to determine a plurality of modules corresponding to the first functionality; and (ii) The module access part determines which of the modules corresponding to the first functionality in (i) are not already installed or natively available on the multi-function apparatus 97 and/or client terminal 95, based on the device information maintained by the maintenance part 97a.

According to another aspect described above, the module access part 97b of the multi-function apparatus 97 determines, based on device information maintained by the maintenance part 97a, which one of a plurality of MFDs connected to the network 91 includes the first module associated with the first functionality.

As described above, the module access part 97b instructs a second device having the first module to execute the first module, in order to provide the first functionality. However, it is also possible for the module access part 97b to instruct the second device 94 to transmit the first module to the client terminal 95 via the network. In this way, the client terminal 95 may itself execute the first module, in order to obtain the first functionality. For example, if the first functionality is the phone/voice functionality (such as converting an audio input into a digital signal), and the first module is a voice data converter module, the multi-function apparatus 97 may instruct the second device 94 to transmit the voice data converter module to the client terminal 95. The client terminal 95 may then utilize the voice data converter module so that the phone/voice functionality may be obtained.

Alternatively, the module access part 97b may provide, to the client terminal via the network, remote access to the first module that is installed/present at the second device 94. For example, the module access part 97b may provide, to the client terminal via the network, access to, and a resource locator (or network address) of, the second device 94, and the client terminal utilizes the resource locator to access the second device in order to obtain the first functionality.

As another example, the module access part 97b may interface the client terminal 95 and the second device 94, such that the client terminal 95 accesses remotely the first module installed at the second device via the network. The client terminal 95 does this in order to obtain the first functionality. The multi-function apparatus 97 may relay data and instructions between the client terminal 95 and the second device, so that the client terminal 95 may communicate with the first module present at the second device 94 through the network. For example, the multi-function apparatus 97 may relay commands and input data, received from the client terminal 95, to the first module via the network, and the multi-function apparatus 97 may relay responses and processed output data, received from the first module via the network, to the client terminal 95. In this way, the client terminal 95 may remotely execute the first module, still installed/present at the second device, in order to obtain the first functionality.

As a demonstrative example, if the first functionality is the phone/voice functionality and the first module is a voice data converter module, the multi-function apparatus 97 may allow the client terminal 95 to remotely access a voice data converter module installed at the second device 94. The client terminal 95 may thus utilize the voice data converter module so that the phone/voice functionality may be obtained.

If modules stored at the various network-connected devices are able to communicate with each other directly via a common protocol, such as HTTP, HTTP(s), html, email, Fax, Samba, Print portal 9100, etc., then the multi-function apparatus may route data between the various modules of the network-connected devices via the network directly, as is known in the art.

If some of the modules at different network-connected devices communicate using different protocols, then the multi-function apparatus may process data transmitted between modules into a common data format in order to allow for proper communication between the various modules. For example, if data received from the client terminal 95 is in a first format, and the second device 94 accepts data in a second format different from the first format, then the multi-function apparatus 97 may process the data in the first format from the client terminal into equivalent data in the second format, and forward this data in the second format to the second device. To aid this process, the multi-function apparatus may store or access via the network one or more Application Programming Interfaces (APIs) corresponding to each of the modules and/or network-connected devices. The APIs may contain information regarding the types of commands accepted by each of the corresponding modules and/or devices.

According to another aspect, the module access part 97b of the multi-function apparatus 97 determines, based on device information maintained by the maintenance part 97a, which one of a plurality of MFDs includes the first module required by a client terminal and is in close geographic proximity to a client terminal.

An example of device information is depicted in FIG. 7, as described above. The device information may list device names corresponding to the devices connected to the network, including client terminal 65, and MFDs 62, 63, 64 and 65, shown in FIG. 9B as being connected to multi-function apparatus 97 via the network 91. The device information also lists the modules installed on each of the devices, as well as the location of each of the devices. For example, it can be seen in the device information of FIG. 7 that the MFD 62 has a system control module, printer user interface module, and printer data communications module, and that MFD 62 is located at location X3, Y3.

Using the example of the module information of FIG. 3 and the device information of FIG. 7, suppose the first functionality in the execution request received from client terminal 95 is a printing functionality, and the module access part 97b has determined that, for example, a printer image processor module, is required by the client terminal for performing the printing functionality.

The module access part 97b then determines, by referring to the device information such as that seen in FIG. 7, that both MFD/printer 63 and MFD/copier 66 include a printer image processor module. The module access part 97b also determines that, for example, printer 63 having a location X4, Y4 is at a geographic location proximate to client terminal 65 having a location X1, Y1, whereas copier 66 having a location X6, Y6 is not at a geographic location proximate to client terminal 65. Put another way, the module access part 97b may determine, based on device location information, that printer image processor module of printer 63 is closer to the client terminal than the printer image processor module of Copier 66. The location information included in the device information is not limited to geographic/physical location information. For example, the device information may also list a network address for each of the network-connected devices, in order to aid in a process of locating a device, communicating with a device, determining modules present on a device and where modules may be obtained in a network.

Thus, according to this aspect, the multi-function apparatus determines which one of a plurality of MFDs connected to a network includes a first module and is in close geographical proximity to a client terminal.

As a demonstrative example of how various aspects of this disclosure may be combined, reference is made to the systems of FIGS. 6 and 9B and the example device information of FIG. 7.

The user of client terminal 65 utilizes the printer user interface module and printer data communication module, natively present at client terminal 65, in order to initiate a print functionality. For example, the user enters commands, via the printer user interface module, and an execution request for performing a printing functionality is transmitted to the multi-function apparatus by the printer data communication module. The system control module of multi-function apparatus communicates with printer 63 via a network, and transmits data to the printer image processor module of printer 63, with instructions for performing various image processing on the data. That is, a module of the multi-function apparatus 67 instructs a network-connected printer 63 having a first module to remotely execute the first module, in order to provide a printing functionality to the multi-function apparatus 67.

The system control module of the multi-function apparatus 67 may then obtain the processed electronic data from printer 63, and determine, based on the device information maintained at the multi-function apparatus, which plotter module is physically closest to the client terminal 65. The system control module of the multi-function apparatus 67 may then transmit the processed data to the closest plotter module, such as the plotter module of printer 63 or copier 66. Thus, the client terminal obtains a printing functionality.

Figure 11A:
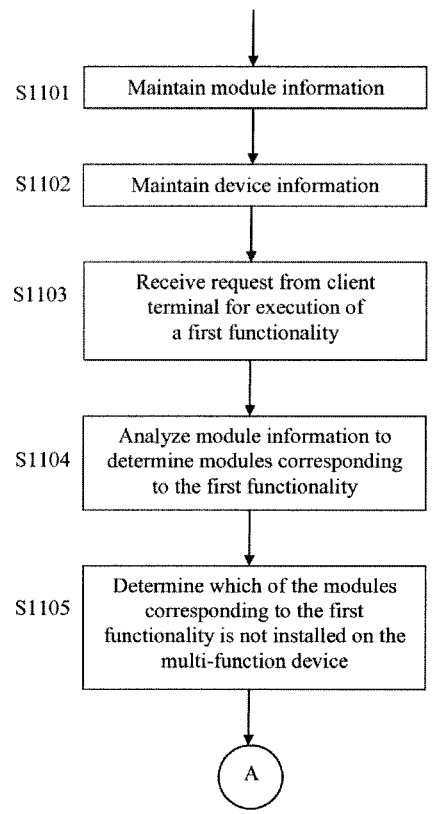
FIGS. 11A and 11B show an example of a more detailed workflow on a multi-function apparatus side.
Figure 11B:
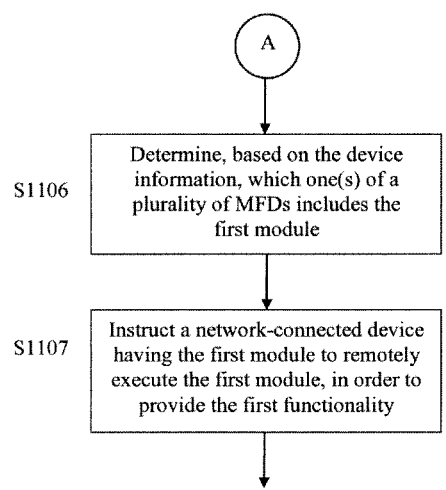

Turning now to FIGS. 11A and 11B, there is shown an example of a workflow on a multi-function apparatus side, such as the multi-function apparatus 97 in FIG. 9, according to certain aforementioned aspects of this disclosure.

Steps S1101 through S1106 are substantially to steps S801 through S806 of FIG. 8. In S1107, the multi-function apparatus instructs a network-connected device having the first module to execute the first module, in order to provide the first functionality. The first functionality may be provided, for example, to client terminal connected to the network, in response to the request for the first functionality (received from the client terminal in S1103).

As an alternative to step S1107, the multi-function apparatus may cause a second network-connected device to transmit the first module to the client terminal via the network, wherein the client terminal executes the first module in order to obtain the first functionality. As another alternative to step S1107, the multi-function apparatus may provide, to the client terminal via the network, access to the first module at the second network-connected device, wherein the client terminal executes the first module at the second device in order to obtain the first functionality.

Figure 12:
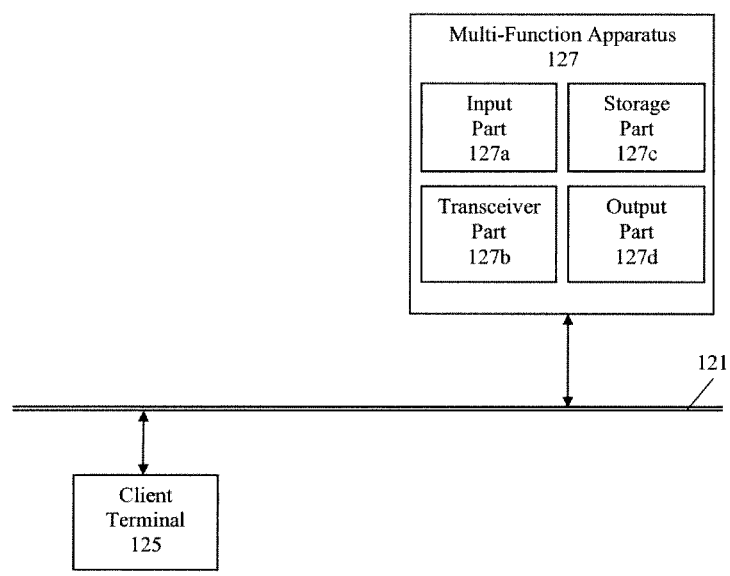
FIG. 12 shows a block diagram of a system, according to another exemplary embodiment of this disclosure.

Turning now to FIG. 12, another exemplary embodiment of this disclosure is described. In this embodiment, the operation of (and interaction between) a plurality of modules similar to the modules described above is described. The modules may, for example, be installed on a multi-function apparatus as described in previous embodiments, and the plurality of modules may include an input part, a transceiver part, a storage part and an output part, as described below.

System 1200 includes a client terminal 125 and a multi-function apparatus 127, both of which are interconnected by a network 121.

The multi-function apparatus 127 may be a device that provides a scanning functionality, a printing functionality, a copying functionality, a facsimile functionality, and/or a plurality of other functions. The multi-function apparatus 127 may be the same or substantially similar to any one of the multi-function apparatuses 17, 67 and 97. The multi-function apparatus 127 may be a client terminal or any computing device including but not limited to a personal, notebook or workstation computer, a kiosk, a PDA (personal digital assistant), a tablet computing device, a smartphone, a scanner, a printer, a facsimile machine, a server, a mobile phone or handset, another information terminal, etc. The multi-function apparatus 127 is configured with software allowing the multi-function apparatus to communicate through the network 121 with client terminal 125.

Multi-function apparatus 127 of FIG. 12 includes an input part 127a, transceiver part 127b, storage part 127c, and output part 127d.

The input part 127a of the multi-function apparatus 127 is configured to store at least one user-request job such as a print job. The print job (or information associated therewith) may be stored in the storage part 127c of the multi-function apparatus 127. The print job may be received from any device connected to the multi-function apparatus 127 through a network.

The input part 127a is also configured to register the print job on a user-requested job list maintained by the multi-function apparatus 127. FIG. 13 depicts an example of a job list maintained by the multi-function apparatus 127. The job list may include a list of the names of registered jobs, all of which have been received by the input part 127a of the multi-function apparatus. The job list maintained by the multi-function apparatus 127 may itself be stored in the storage part 127c of the multi-function apparatus 127. The job list may also include other types of information relating to each registered job.

The transceiver part 127b of the multi-function apparatus 127 is configured to receive a request for the job list, and the client terminal 125 may be configured with a user interface to allow a user to transmit a request to the multi-function apparatus 127 for the job list. For example, when the transceiver part 127b receive a request from client terminal 125, the transceiver part 127b outputs the job list to the client terminal 125, in response to the request for the job list from the client terminal.

The transceiver part 127b is also configured to receive, from client terminal 125 to which the job list was transmitted to, user selection of at least one job from the job list. The client terminal may be configured with hardware and/or software to allow a user of the client terminal to view the job list transmitted to the terminal from the multi-function apparatus 127, and to select one of the jobs listed in the viewable job list. The job list may be displayed on, for example, a monitor, screen, touch screen or some other display unit (not shown) on the client terminal.

FIG. 14 depicts an example of a user interface of the client terminal. In the example of FIG. 14, the user interface of the client terminal displays a job list, similar to the job list depicted in FIG. 13, and allows the user to select one of the jobs listed in the job list. The user selection of the job from the job list is then transmitted from the client terminal to the multi-function apparatus 127.

The output part 127d of the multi-function apparatus 127 is configured to output the job (e.g. print job), selected by the user of the client terminal 125, to the client terminal.

As a demonstrative example, suppose the multi-function apparatus 127 receives a request for the job list from the client terminal 125, and the multi-function apparatus then selectively outputs the job list to the client terminal. The multi-function apparatus 127 then receives, from the client terminal, user selection of a job from the job list transmitted to the client terminal. For instance, the multi-function apparatus 127 may receive user selection of "PrintJob 03" from the job list illustrated in FIG. 13. The output part of the multi-function apparatus then transmits the selected job ("PrintJob 03") to the client terminal. In this way, the output part of the multi-function apparatus may output a job to the client terminal, in response to a request for the job from the client terminal.

Further, the output part 127d may output the selected job to the client terminal in a printer-dependent format corresponding to the client terminal.

For example, the multi-function apparatus 127 may store a printer driver(s) corresponding to the client terminal and other devices connected to the network 121. (The print jobs received and stored at the multi-function apparatus 127 may be stored in either a printer dependent or printer independent format). When a print job stored at the multi-function apparatus 127 is to be outputted to the client terminal or another device connected to the network 121 (not shown), the multi-function apparatus may, if necessary, convert the print job into a printer dependent format corresponding to the client terminal or other device connected to the network 121, with the use of the print driver corresponding to the specific terminal/device.

Thus, according to this exemplary embodiment of this disclosure, there is provided the tools for remotely accessing functions of a multi-function apparatus. According to the aforementioned aspects, a user may submit a job to the multi-function apparatus, without having to commit to a destination device for ultimately performing/receiving the print operation. At a later time, the user may then decide which terminal or device is most convenient for receiving and collecting the job. The user may then simply operate the desired destination device to communicate with the multi-function apparatus and select the job from a job list, and the selected job will be submitted to the desired destination device. This may be useful when, for example, there are a number of possible devices available for performing print jobs, such as terminals or printers in one or more offices of an enterprise or other organization.

Figure 15:
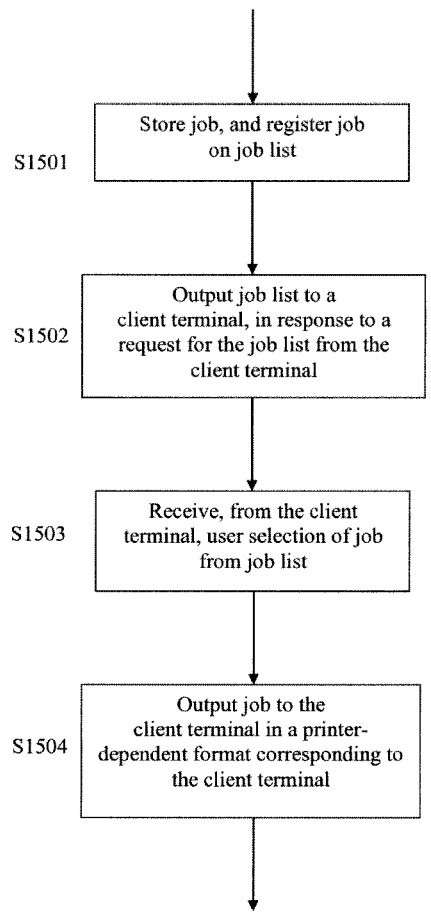
FIG. 15 shows an example of a workflow on a multi-function apparatus side.

Turning now to FIG. 15, there is shown an example of a workflow on a multi-function apparatus side, such as the multi-function apparatus 127 in FIG. 12.

In S1501, the multi-function device stores a job, and registers the job on a job list maintained by the multi-function apparatus. An example of such job list is depicted in FIG. 13. The job may be received from any device connected to the multi-function apparatus via network.

In S1502, the multi-function apparatus outputs the job list to a client terminal, in response to a request for the job list from the client terminal. In S1503, the multi-function apparatus receives, from the client terminal to which the job list was transmitted to in S1502, user selection of a job from the job list. FIG. 14 illustrates an example of a user interface of the client terminal that allows a user to view a job list and select a job from the job list.

In S1504, the multi-function apparatus outputs the selected job (per the user selection received in S1503) to the client terminal. The selected job may be output to the client terminal in a printer-dependent format corresponding to the client terminal.

According to another aspect of this embodiment, security features are provided so that a user is only able to perform jobs that are authorized for the user.

In particular, the print job stored by the input part 127a of the multi-function apparatus 127 may be registered in the job list in association with user information, wherein the user information indicates an authorized user of the job. The authorized user of the job may be, for example, an author or intended recipient of the job. The input part 127a may determine the user information by analyzing job information included in the job (such as print job information included in the header of the print job, for example).

FIG. 16 depicts an example of a job list, similar to the job list depicted in FIG. 13, except that the jobs (identified by job ID) are registered in the job list in association with user information. For example, "Print Job 71" is registered in association with the user information "John Smith", "PrintJob 73" is registered in association with the user information "Jane Doe", and so forth. The user information may include information such as usernames, email addresses, passwords, screen names, telephone numbers, facsimile numbers, and biometric information (fingerprints, palm prints, voice or speech, retinas or irises, facial expressions or features, signature, etc.).

Furthermore, the request for the job list, received at the transceiver part 127b from the client terminal 125, may include requesting user information. The requesting user information may identify the individual operating client terminal 125 who is requesting the job list. The requesting user information may include information such as usernames, email addresses, passwords, screen names, telephone numbers, facsimile numbers, and biometric information (fingerprints, palm prints, voice or speech, retinas or irises, facial expressions or features, signature, etc.).

According to this embodiment, after the transceiver part 127b receives the request for the job list and the requesting user information, the transceiver part compares the requesting user information with the user information registered in the job list, and determines whether any of the user information registered in the job list matches the requesting user information. Using the job list depicted in FIG. 16, for example, if the requesting user information is the name "John Smith", the transceiver part determines that user information "John Smith" is registered in the job list, and that a plurality of jobs (PrintJob 71, PrintJob 72 and PrintJob 74) are registered in association with this user information "John Smith".

The transceiver part 127b only transmits a portion of the job list to client terminal that includes print jobs registered in association with the requesting user information. If, for example, the requesting information is "John Smith", the transceiver part 127b will only transmit the portion of the job list including PrintJob 71, PrintJob 72 and PrintJob 74 (registered in association with user information "John Smith") as seen in FIG. 16, to the client terminal 125.

Thus according to this aspect, security features are provided so that a user of a terminal or device is only able to view a job list of jobs that are authorized for that particular user. The user may than select one of the presented jobs, which will be transmitted from the multi-function device to the client terminal.

Figure 17:
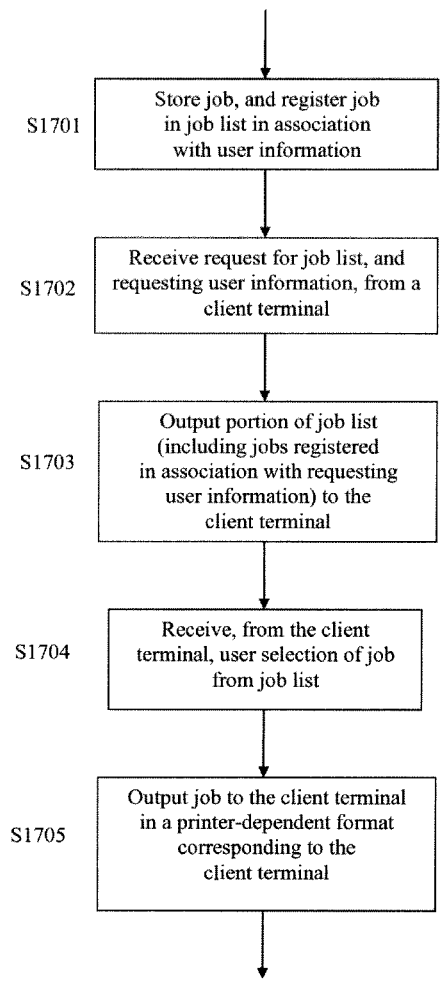
FIG. 17 shows an example of a more detailed workflow on a multi-function apparatus side.

Turning now to FIG. 17, there is shown an example of a more detailed workflow on a multi-function apparatus side, such as the multi-function apparatus 127 in FIG. 12, according to this exemplary embodiment of this disclosure.

In S1701, the multi-function apparatus stores a job. The multi-function apparatus also registers the job on a job list maintained by the multi-function apparatus, wherein the job is registered in the job list in association with user information indicating an authorized user of the job. An example of such job list is depicted in FIG. 16.

In S1702, the multi-function apparatus receives a request for a job list, as well as requesting user information from a client terminal. Thereafter, in S1703, the multi-function apparatus transmits, to the client terminal, a portion of the=job list including jobs registered in association with the requesting user information.

In S1704, the multi-function apparatus receives, from the client terminal to which the job list was transmitted to in S1703, user selection of a job from the job list. Finally, in S1705, the multi-function apparatus outputs the selected job (per the user selection received in S1704) to the client terminal, in a printer-dependent format corresponding to the client terminal.

Figure 18:
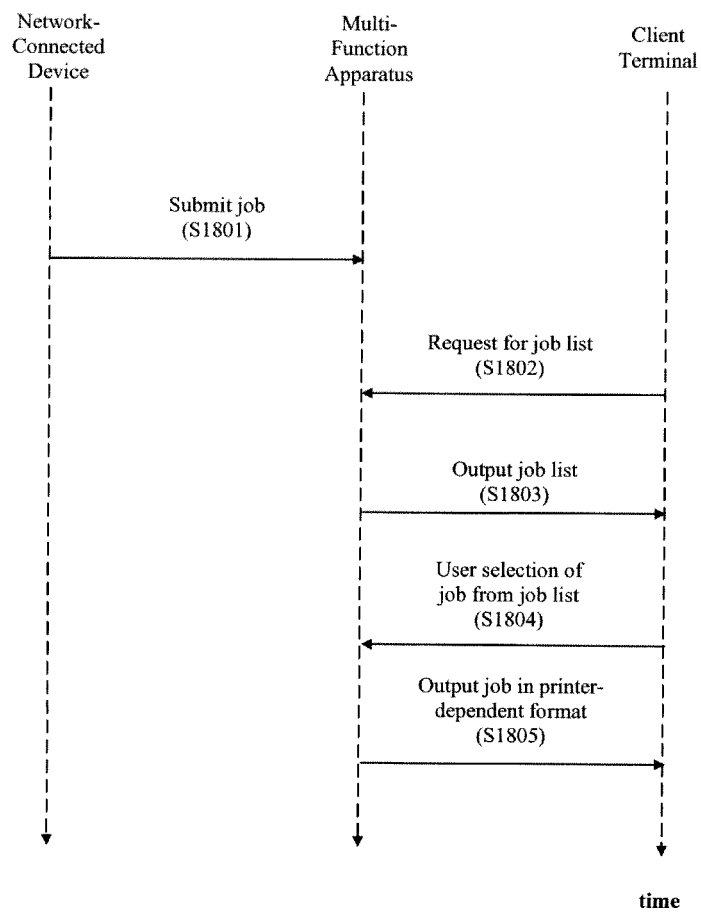
FIG. 18 shows a schematic view of an example of a data flow.

Turning now to FIG. 18, a schematic view of an example of data flow is presented.

In S1801, a network-connected device submits a job to the multi-function apparatus. The multi-function apparatus stores the job, and registers the job on a job list maintained by the multi-function apparatus. Thereafter, in S1802, the multi-function apparatus receives a request for the job list from a client terminal. The multi-function apparatus outputs the job list to the client terminal in S1803, in response to the request received in S1802. The multi-function apparatus then receives, from the client terminal, user selection of a job from the job list in S1804. Finally, in S1805, the multi-function apparatus outputs the job (per the user selection received in S1804) to the client terminal, in a printer-dependent format corresponding to the client terminal.

According to another aspect of this embodiment, the multi-function apparatus is able to provide device data of a network-connected device to a requester.

According to this aspect, the input part 127a of the multi-function apparatus 127 is configured to receive a request for the device data corresponding to a network-connected device (not shown) connected to the network 121. The request for the device data may be received from the client terminal 125, for example.

The multi-function apparatus 127 is then configured to communicate with the network-connected device to obtain the device data from the network-connected device. For example, the input part 127a and/or transceiver part 127b may broadcast a Simple Network Management Protocol (SNMP) query to the network 121 and/or the network-connected device, and the network-connected device may respond to the query by transmitting the device data stored in a Management Information Base (MIB) database of the network-connected device. Once the multi-function apparatus 127 receives the device data of the network-connected device, the device data may be stored in the storage part 127c of the multi-function apparatus 127. Finally, the output part 127d of the multi-function apparatus transmits the obtained device data to the entity that requested the device data (such as client terminal 125).

Figure 19:
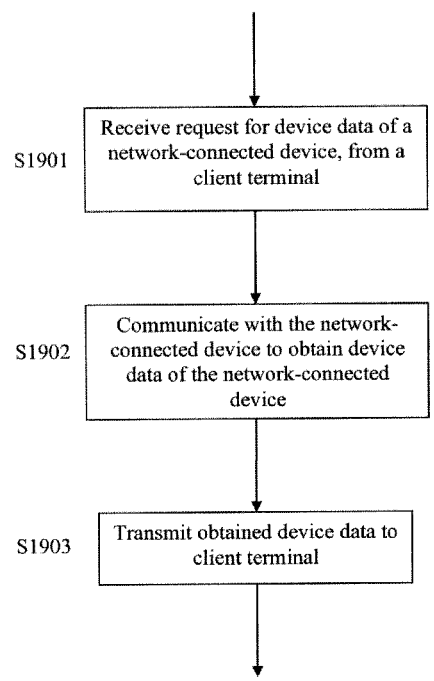
FIG. 19 shows an example of a workflow on a multi-function apparatus side, in another exemplary embodiment.

Turning now to FIG. 19, there is shown an example of a more detailed workflow on a multi-function apparatus side, such as the multi-function apparatus 127 in FIG. 12, according to this exemplary embodiment of this disclosure.

In S1901, the multi-function apparatus receives a request for the device data of a network-connected device. The request for the device data may be received from a client terminal. Thereafter, in S1902, the multi-function apparatus communicates with the network-connected device to obtain the device data from the network-connected device. Finally, in S1903, the multi-function apparatus transmits the obtained device data to the client terminal.

Figure 20:
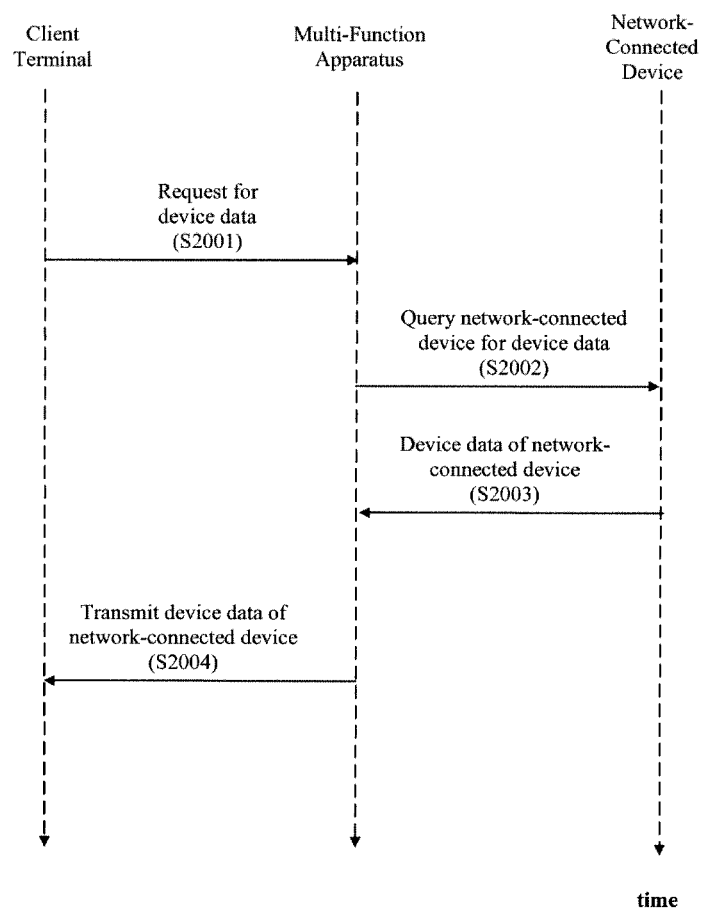
FIG. 20 shows a schematic view of an example of a data flow, in another exemplary embodiment.

Turning now to FIG. 20, a schematic view of an example of data flow is presented, according to this exemplary embodiment.

In S2001, the multi-function apparatus receives a request for the device data of a network-connected device, from a client terminal. In S2002, the multi-function apparatus broadcasts a query via a network to the network-connected device for the device data of the network-connected device. In response to the query transmitted in S2002, the network-connected device transmits the device data to the multi-function apparatus, in S2003. Finally, in S2004, the multi-function device transmits the obtained device data of the network-connected device to the client terminal.

According to another aspect of this embodiment, the multi-function apparatus is able to provide a scanned job directly to a desired destination of the scan job.

According to this aspect, the input part 127a of the multi-function apparatus 27 is configured to receive a scan job and destination information indicating a destination of the scan job. The scan job and destination information may be received from one of the client terminal 125. Moreover, the scan job and destination information may be input directly into the multi-function apparatus 127 itself if, for example, the multi-function apparatus includes a scanner component. The scan job and destination information received by the input part 127a may be stored in the storage part 127c.

The output part 127d of multi-function apparatus 127 is then configured to determine a transmission protocol corresponding to the destination of the scan job, based on the destination information. For example, the destination information may indicate a website, an email address, a fax number, a printer IP address, etc., and the output part 87d determines the transmission protocol corresponding to the destination (e.g. HTTP, SMTP, Fax protocol, Print port 9100, etc. . . . ). The output part 127d processes the scan job, based on the transmission protocol determined above, to generate a processed scan job. For example, if the destination information is an email address and the transmission protocol is determined to be SMTP, the output part 127d may generate an email directed towards the destination email address, with an attachment that includes a PDF of the scanned job. Finally, the output part 127d outputs the processed scan job to the destination of the scan job.

Figure 21:
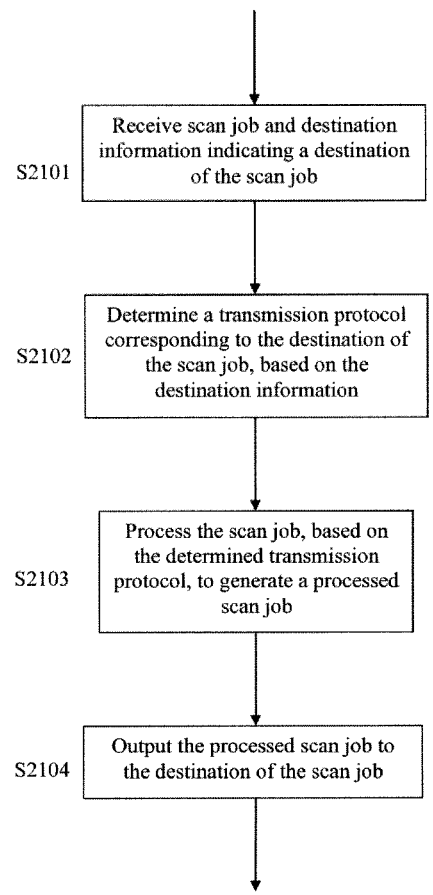
FIG. 21 shows an example of a workflow on a multi-function apparatus side, in another exemplary embodiment

Turning now to FIG. 21, there is shown an example of a more detailed workflow on a multi-function apparatus side, such as the multi-function apparatus 127 in FIG. 12, according to this exemplary embodiment of this disclosure.

In S2101, the multi-function apparatus receives a scan job and destination information indicating a destination of the scan job. Thereafter, in 2102, the multi-function apparatus determines a transmission protocol corresponding to the destination of the scan job, based on the destination information. The multi-function apparatus processes the scan job, based on the transmission protocol determined in S2102, to generate a processed scan job, in S2103. Finally, in S2104, the multi-function apparatus outputs the processed scan job to the destination of the scan job.

While the example shown in this disclosure include one multi-function apparatus and one client terminal, it should be appreciated that such numbers of devices, terminals and apparatuses are arbitrary and are selected as an example in order to facilitate discussion, and that the subject matter of this disclosure can be implemented in a system including one or more systems, servers, apparatuses and terminals. Other devices, such as scanners, printers and multi-function devices (MFDs) may also be connected to a network, as is well known in the art.

Figure 22A:
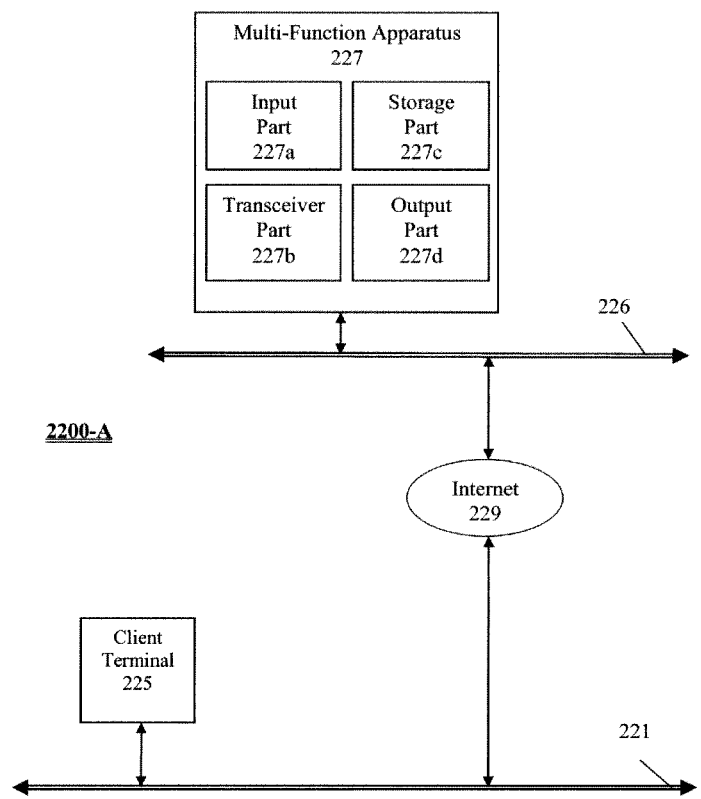
FIGS. 22A through 22C show block diagrams of systems with different arrangements.
Figure 22B:
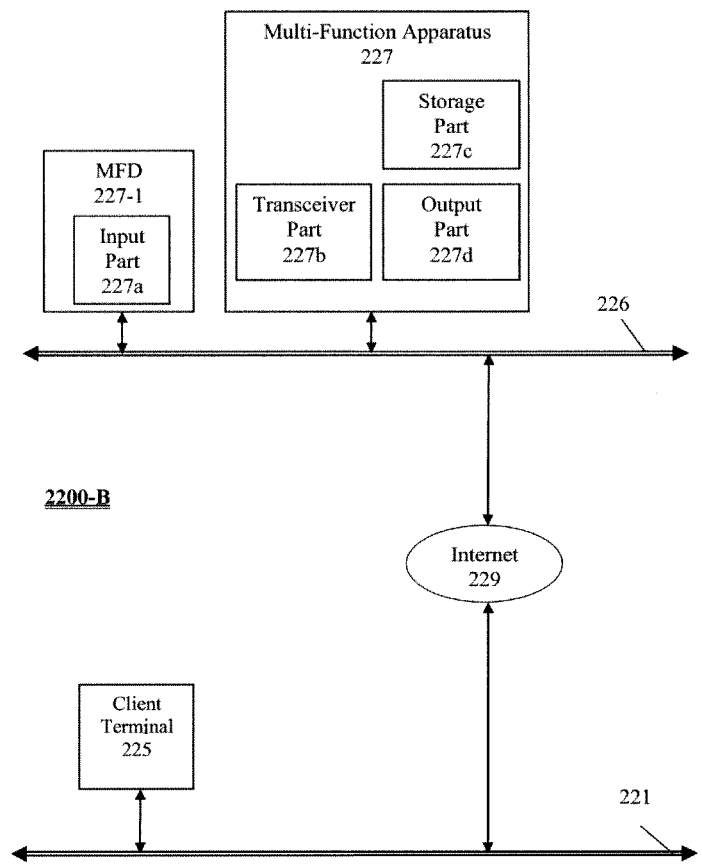
Figure 22C:
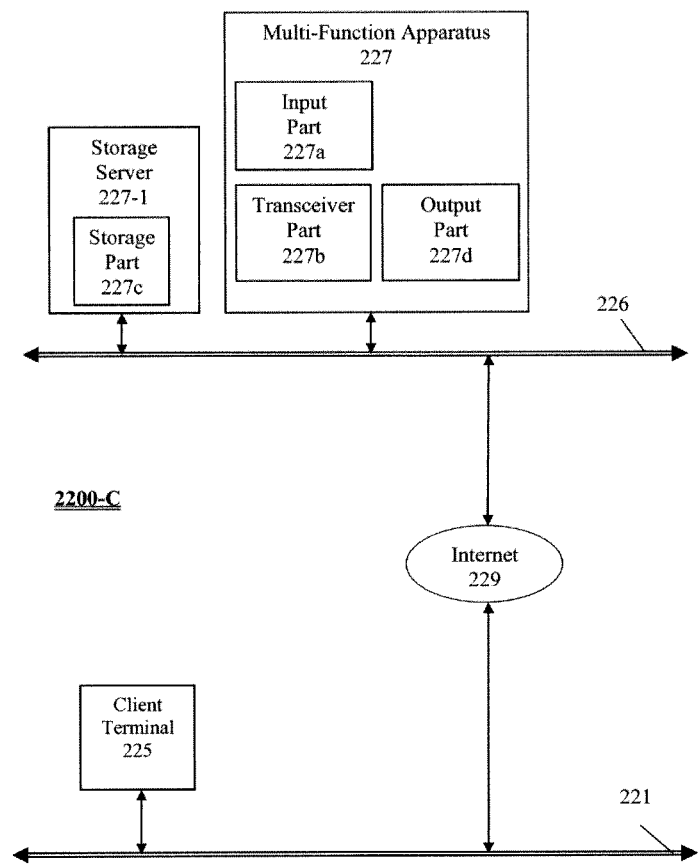

FIGS. 22A through 22C, for example, depict systems 2200-A, 2200-B and 2200-C respectively, each with different network arrangements. As shown in FIGS. 22A through 22C, the system provides a multi-function apparatus as a FAT apparatus which has many functions in it or a THIN apparatus which has less functions in it.

In system 2200-A, a client terminal 225 is connected to a first network 221 and a multi-function apparatus 227 is connected to a second network 226. The multi-function apparatus 227 and the client terminal 225 are able to communicate with each other via, for example, the internet 229.

System 2200-B of FIG. 22B is similar to system 2200-A depicted in FIG. 22A, expect that the input part 227a of multi-function apparatus 227 is not contained directly within the multi-function apparatus. Instead, the input part 227a may be part of another multi-function apparatus or a multi-function device MFD 227-1 connected to multi-function apparatus 227 via network 226.

System 2200-C of FIG. 22C is similar to system 2200-A depicted in FIG. 22A, expect that the storage part 227c of multi-function apparatus 227 is not contained directly within the multi-function apparatus. Instead, the storage part 227c may be part of a storage repository or storage server 227-1 connected to multi-function apparatus 227 via network 226.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A multi-function apparatus configured to provide functionalities to a client terminal connected via a network, said multi-function apparatus comprising: a maintenance part configured to maintain module information indicating, for each of the functionalities, one or more modules corresponding to the functionality; and a module access part configured to determine, based on the module information maintained by the maintenance part, a first module associated with a first functionality, in response to a request, received from the client terminal via the network, for the first functionality, and cause said first module to be retrieved via the network from another device, and to be executed in response to the request from the client terminal via the network, wherein the module access part causes the first module, retrieved via the network from said another device, to be remotely executed by the multi-function apparatus in order to provide the first functionality.

2. The multi-function apparatus of claim 1, wherein the multi-function apparatus causes a result of the execution of the first module to be provided via the network to the client terminal, in response to the request from the client terminal.

3. The multi-function apparatus of claim 1, wherein the module access part determines said first module associated with the first functionality by (i) analyzing the module information to determine a plurality of modules corresponding to the first functionality, and (ii) determining which of said plurality of modules corresponding to the first functionality is not natively available on the multi-function apparatus.

4. The multi-function apparatus of claim 1, wherein the module access part causes the retrieved first module to be transmitted to the client terminal via the network, and the client terminal executes the first module at the client terminal in order to obtain the first functionality.

5. The multi-function apparatus of claim 1, wherein the module access part determines said first module associated with the first functionality by (i) analyzing the module information to determine a plurality of modules corresponding to the first functionality, and (ii) determining which of said plurality of modules corresponding to the first functionality is not natively available on the client terminal.

6. The multi-function apparatus of claim wherein the module access part provides a resource locator of the retrieved first module to enable the client terminal to access the first module via the network, and the client terminal utilizes the resource locator to the first module in order to obtain the first functionality.

7. The multi-function apparatus of claim 1, wherein the maintenance part maintains device information indicating, for each of a plurality of multi-function devices connected to the network, modules available from the multi-function device, and
the module access part determines, based on the device information maintained by the maintenance part, one of the plurality of multi-function devices from which the first module is to be obtained.

8. The multi-function apparatus of claim 7, wherein the module access part retrieves said first module via the network from said one of the plurality of multi-function devices, and causes said first module to be executed in order to provide the first functionality.

9. The multi-function apparatus of claim 1, further comprising:
a storage part configured to store code modules; and
a control part configured to execute said first module and one or more of the code modules to obtain the first functionality.

10. The multi-function apparatus of claim 1, wherein a result of the execution of the first module by the network-connected device is provided, via the network, to any one of the client terminal, the multi-function apparatus, and a storage device connected to the network.

11. The multi-function apparatus of claim 1, wherein the module access part interfaces the client terminal and the network-connected device, such that the client terminal remotely accesses the first module at the network-connected device via the network, to obtain the first functionality.

12. A method for providing, by a multi-function apparatus, functionalities to a client terminal via a network, said method comprising: maintaining module information indicating, for each of the functionalities, one or more modules corresponding to the functionality; determining, based on the module information, a first module associated with a first functionality, in response to a request, received from the client terminal via the network, for the first functionality; and retrieving said first module, via the network from another device, and causing the first module to be executed in response to the request from the client terminal via the network, wherein the first module, retrieved via the network from said another device, is remotely executed by the multi-function apparatus in order to provide the first functionality.

13. The method of claim 12, further comprising maintaining device information indicating modules installed on the multi-function apparatus;
analyzing the module information to determine a plurality of modules corresponding to the first function; and
determining the first module by determining which of said plurality of modules corresponding to the first function are not installed on the multi-function apparatus, based on the device information.

14. The method of claim 12, further comprising maintaining device information indicating, for each of a plurality of multi-function devices connected to the network, modules available from the multi-function device, and
determining, based on the device information, which one of the plurality of multi-function devices includes the first module.

15. The method of claim 12, further comprising providing a result of the execution of the first module by the multi-function apparatus to the client terminal via the network, in response to the request for the first functionality received from the client terminal.

16. The method of claim 12, further comprising providing, to the client terminal via the network, access to, and a resource locator of, the retrieved first module, wherein the client terminal utilizes the resource locator to the first module in order to obtain the first functionality.

17. A multi-function apparatus configured to provide functionalities to a client terminal connected via a network, said multi-function apparatus comprising: a maintenance part configured to maintain module information indicating, for each of the functionalities, one or more modules corresponding to the functionality; and a module access part configured to determine, based on the module information maintained by the maintenance part, a first module associated with a first functionality, in response to a request, received from the client terminal via the network, for the first functionality, and instruct a network-connected device having the first module to remotely execute the first module, in order to provide the first functionality, wherein the module access part determines which one of a plurality of multi-function devices connected to the network includes the first module, and the module access part instructs said one of the plurality of multi-function devices to remotely execute the first module, in order to provide the first functionality.

* * * * *